Patented Dec. 4, 1928.

1,693,890

UNITED STATES PATENT OFFICE.

JACQUES DUCLAUX, OF PARIS, FRANCE.

ULTRAFILTER MEMBRANE.

No Drawing. Application filed August 30, 1923. Serial No. 660,180, and in France September 11, 1922.

In a large number of industrial operations, extensive use is made of solutions of certain substances in benzene, carbon tetrachloride and carbon sulphide, hydrocarbons or their halogenated derivatives, ethers, aldehydes, ketones and, more generally, in all liquids which are known as solvents for fatty bodies and resins. It is often useful to be able to treat these solutions by dialysis or by ultra-filtration, as can be done for aqueous solutions.

The membranes used for the aqueous solutions do not lend themselves, generally, to dialysis, and particularly not to ultra-filtration of the solutions in these solvents for fatty bodies and resins.

The present invention has for its object membranes of cellulose acetate specially prepared for the applications considered above. The characteristic of these membranes is that they are prepared under the form of jellies, that is, in porous form, in distinction from the compact form.

The invention concerns also the process of utilization of these porous membranes for the dialysis and the ultra-filtration of solutions such as those mentioned above.

According to this invention, cellulose esters are obtained in the porous form by precipitating them from their solutons by the addition of a non-solvent such as water or an alcohol, or in allowing these solutions to dry incompletely until they are solidified. For cellulose acetate, particularly, acetic acid is taken as solvent and the cellulose acetate is coagulated by contact with water. The membranes so obtained will be naturally impregnated with water. If it is desired to use them for the dialysis of a solution in benzene, for instance, one must first get rid of the water by washing with alcohol or acetone, or by means of any other liquid miscible at the same time with water and with benzene.

The membranes of cellulose acetate may be used for the dialysis and the ultra-filtration of solutions in water, the alcohols, and solvents of fatty bodies generally. Their use is therefore much wider than that of membranes of nitro-cellulose or cellulose. This property is an intrinsic property, which does not depend on the manner in which these membranes are prepared and which nothing could lead to foresee. If one compares, for instance, a cellulose acetate membrane with another having in appearance identical properties but formed with cellulose (viscose or denitrated nitro-cellulose) it is seen that both may be equivalent with respect to an aqueous solution, but that in a benzene solution, the acetate membrane will dialyze in a normal manner, while that of cellulose will harden and become practically impermeable.

The only condition that these membranes must fulfill, particularly for the ultra-filtration, is that they must be porous, as it has been said above. One can form them on a support intended to give them a greater mechanical resistance, such as cloth, for instance in which case cloth is saturated with the ester and thereafter placed in the non-solvent, water, etc. Or the acetate is flowed onto a glass plate coagulated and the film stripped off or in other ways.

This process may be applied to solutions having any degree of concentration. It may also be applied to the direct filtration of oils or other fatty substances, for their clarification or purification, without these substances being in solution.

In this particular case, as well as in the general case, it may be advantageous to effect the operation at a higher temperature than the surrounding temperature in order to augment the fluidity of the substances being treated and consequently the output of the production.

The method of making a cellulose acetate filter, which comprises immersing a non-metallic cloth in cellulose acetate dissolved in acetic acid until the yarns are impregnated and the interstices of the weave are filled, then coagulating the acetate by water and washing out the surplus water with a liquid miscible with water and the substance to be treated by the filter.

In testimony that I claim the foregoing as my invention, I have signed my name.

JACQUES DUCLAUX.